(12) United States Patent
Bradbury et al.

(10) Patent No.: US 8,535,153 B2
(45) Date of Patent: Sep. 17, 2013

(54) VIDEO GAME SYSTEM AND METHODS OF OPERATING A VIDEO GAME

(76) Inventors: Jonathan Bradbury, Inglewood, CA (US); Stephen Lister, Long Beach, CA (US); Daniel Stelung, Irvine, CA (US)

(*) Notice: Subject to any disclaimer, the term of this patent is extended or adjusted under 35 U.S.C. 154(b) by 0 days.

(21) Appl. No.: 12/978,764

(22) Filed: Dec. 27, 2010

(65) Prior Publication Data

US 2011/0092286 A1    Apr. 21, 2011

Related U.S. Application Data

(63) Continuation of application No. 11/530,863, filed on Sep. 11, 2006, now Pat. No. 7,883,420.

(60) Provisional application No. 60/716,563, filed on Sep. 12, 2005, provisional application No. 60/717,540, filed on Sep. 14, 2005, provisional application No. 60/722,143, filed on Sep. 29, 2005, provisional application No. 60/730,225, filed on Oct. 24, 2005, provisional application No. 60/733,653, filed on Nov. 4, 2005, provisional application No. 60/765,274, filed on Feb. 3, 2006, provisional application No. 60/772,314, filed on Feb. 10, 2006, provisional application No. 60/797,958, filed on May 5, 2006, provisional application No. 60/802,607, filed on May 22, 2006.

(51) Int. Cl.
*A63F 9/24* (2006.01)

(52) U.S. Cl.
USPC .............................................. 463/31; 463/43

(58) Field of Classification Search
USPC ...................................................... 463/31, 43
See application file for complete search history.

(56) References Cited

U.S. PATENT DOCUMENTS

| | | | |
|---|---|---|---|
| 3,052,041 A | 9/1962 | Luxton et al. |
| 3,292,489 A | 12/1966 | Johnson et al. |
| 3,314,165 A | 4/1967 | Shreck et al. |
| 3,654,706 A | 4/1972 | Perrella |
| 3,662,078 A | 5/1972 | Holiday |
| 3,665,618 A | 5/1972 | Hahn |

(Continued)

FOREIGN PATENT DOCUMENTS

| CA | 2196048 | 2/1996 |
|---|---|---|
| CN | 1867383 A | 11/2006 |

(Continued)

OTHER PUBLICATIONS

Product Packaging for Star Wars CommTech Action Figures, © 1999 Hasbro, Inc.

(Continued)

*Primary Examiner* — Pierre E Elisca (74) *Attorney, Agent, or Firm* — Edell, Shapiro & Finnan LLC (57) ABSTRACT

Video game systems for executing instructions according to a video game contained on an item of first media including: an item of second media containing data defining an aspect of the video game; and a video game console including a housing, a first media device supported by the housing, a second media device supported by the housing, and a control unit supported by the housing and configured to control the first media device to read the item of first media and to control the second media device to read the item of second media.

20 Claims, 4 Drawing Sheets

(56) References Cited

U.S. PATENT DOCUMENTS

| | | |
|---|---|---|
| 3,713,148 A | 1/1973 | Cardullo et al. |
| 3,745,673 A | 7/1973 | Jimerson et al. |
| 3,757,322 A | 9/1973 | Barkan et al. |
| 3,795,063 A | 3/1974 | Nelson |
| 3,798,370 A | 3/1974 | Hurst |
| 3,798,792 A | 3/1974 | Askew |
| 3,911,215 A | 10/1975 | Hurst et al. |
| 3,920,124 A | 11/1975 | Patterson |
| 3,981,087 A | 9/1976 | Sachs |
| 4,023,807 A | 5/1977 | Santianni |
| 4,028,537 A | 6/1977 | Snow |
| 4,078,316 A | 3/1978 | Freeman |
| 4,100,541 A | 7/1978 | Quesnell |
| 4,136,336 A | 1/1979 | Abe et al. |
| 4,176,470 A | 12/1979 | Fosner et al. |
| 4,220,815 A | 9/1980 | Gibson et al. |
| 4,221,927 A | 9/1980 | Dankman et al. |
| 4,287,568 A | 9/1981 | Lester |
| 4,341,385 A | 7/1982 | Doyle et al. |
| 4,359,220 A | 11/1982 | Morrison et al. |
| 4,391,447 A | 7/1983 | Dudley |
| 4,525,148 A | 6/1985 | Narayanan |
| 4,545,023 A | 10/1985 | Mizzi |
| 4,550,250 A | 10/1985 | Mueller et al. |
| 4,630,209 A | 12/1986 | Saito et al. |
| 4,654,658 A | 3/1987 | Walton |
| 4,674,618 A | 6/1987 | Eglise et al. |
| 4,686,332 A | 8/1987 | Greanias et al. |
| 4,696,653 A | 9/1987 | McKeefery |
| 4,706,090 A | 11/1987 | Hashiguchi et al. |
| 4,764,666 A | 8/1988 | Bergeron |
| 4,802,092 A | 1/1989 | Harte |
| 4,814,595 A | 3/1989 | Gilboa |
| 4,836,075 A | 6/1989 | Armstrong |
| 4,840,602 A | 6/1989 | Rose |
| 4,848,767 A | 7/1989 | Correro |
| 4,853,498 A | 8/1989 | Meadows et al. |
| 4,853,499 A | 8/1989 | Watson |
| 4,857,030 A | 8/1989 | Rose |
| 4,858,930 A | 8/1989 | Sato |
| 4,882,473 A | 11/1989 | Bergeron et al. |
| 4,913,463 A | 4/1990 | Tlapek et al. |
| 4,922,061 A | 5/1990 | Meadows et al. |
| 4,923,428 A | 5/1990 | Curran |
| 4,936,185 A | 6/1990 | Yamaguchi et al. |
| 4,949,327 A | 8/1990 | Forsse et al. |
| 4,968,255 A | 11/1990 | Lee et al. |
| 4,990,093 A | 2/1991 | Frazer et al. |
| 5,007,085 A | 4/1991 | Greanias et al. |
| 5,013,047 A | 5/1991 | Schwab |
| 5,019,714 A | 5/1991 | Knowles |
| 5,023,408 A | 6/1991 | Murakami et al. |
| 5,026,058 A | 6/1991 | Bromley |
| 5,030,117 A | 7/1991 | Delorme |
| 5,030,807 A | 7/1991 | Landt et al. |
| RE33,662 E | 8/1991 | Blair et al. |
| 5,041,826 A | 8/1991 | Milheiser |
| 5,050,883 A | 9/1991 | Goldfarb et al. |
| 5,057,024 A | 10/1991 | Sprott et al. |
| 5,082,286 A | 1/1992 | Ryan et al. |
| 5,088,928 A | 2/1992 | Chan |
| 5,105,220 A | 4/1992 | Knodt et al. |
| 5,109,510 A | 4/1992 | Baker et al. |
| 5,113,178 A | 5/1992 | Yasuda et al. |
| 5,117,071 A | 5/1992 | Greanias et al. |
| 5,120,065 A | 6/1992 | Driscoll et al. |
| 5,129,654 A | 7/1992 | Bogner |
| 5,134,388 A | 7/1992 | Murakami et al. |
| 5,149,919 A | 9/1992 | Greanias et al. |
| 5,157,384 A | 10/1992 | Greanias et al. |
| 5,166,502 A | 11/1992 | Rendleman et al. |
| 5,174,789 A | 12/1992 | Yu et al. |
| 5,184,830 A | 2/1993 | Okada et al. |
| 5,188,368 A | 2/1993 | Ryan |
| 5,188,533 A | 2/1993 | Wood |
| 5,190,285 A | 3/1993 | Levy et al. |
| 5,212,368 A | 5/1993 | Hara |
| 5,213,510 A | 5/1993 | Freeman |
| 5,220,136 A | 6/1993 | Kent |
| 5,231,568 A | 7/1993 | Cohen et al. |
| 5,241,160 A | 8/1993 | Bashan et al. |
| 5,249,806 A | 10/1993 | Nathanson |
| 5,252,814 A | 10/1993 | Tooley |
| 5,275,567 A | 1/1994 | Whitfield |
| 5,298,731 A | 3/1994 | Ett |
| 5,302,132 A | 4/1994 | Corder |
| 5,317,330 A | 5/1994 | Everett et al. |
| 5,330,380 A | 7/1994 | McDarren et al. |
| 5,340,317 A | 8/1994 | Freeman |
| 5,349,129 A | 9/1994 | Wisniewski et al. |
| 5,372,511 A | 12/1994 | Keung |
| 5,373,440 A | 12/1994 | Cohen et al. |
| 5,402,151 A | 3/1995 | Duwaer |
| 5,411,259 A | 5/1995 | Pearson et al. |
| 5,413,355 A | 5/1995 | Gonzalez |
| 5,417,421 A | 5/1995 | Bagley |
| 5,417,575 A | 5/1995 | McTaggart |
| 5,428,528 A | 6/1995 | Takenouchi et al. |
| 5,434,572 A | 7/1995 | Smith |
| 5,435,573 A | 7/1995 | Oakford |
| 5,451,178 A | 9/1995 | Yorozu et al. |
| 5,481,265 A | 1/1996 | Russell |
| 5,485,176 A | 1/1996 | Ohara et al. |
| 5,498,002 A | 3/1996 | Gechter |
| 5,511,980 A | 4/1996 | Wood |
| 5,517,407 A | 5/1996 | Weiner |
| 5,520,544 A | 5/1996 | Manico et al. |
| 5,532,654 A | 7/1996 | Ieki et al. |
| 5,533,124 A | 7/1996 | Smith et al. |
| 5,538,430 A | 7/1996 | Smith et al. |
| 5,540,301 A | 7/1996 | Dumont |
| 5,562,453 A | 10/1996 | Wen |
| 5,575,659 A | 11/1996 | King et al. |
| 5,579,487 A | 11/1996 | Meyerson et al. |
| 5,588,678 A | 12/1996 | Young |
| 5,618,182 A | 4/1997 | Thomas |
| 5,648,753 A | 7/1997 | Martin |
| 5,651,548 A | 7/1997 | French et al. |
| 5,655,136 A | 8/1997 | Morgan |
| 5,662,332 A | 9/1997 | Garfield |
| 5,664,157 A | 9/1997 | Takahira et al. |
| 5,681,170 A | 10/1997 | Rieber et al. |
| 5,686,705 A | 11/1997 | Conroy et al. |
| 5,689,561 A | 11/1997 | Pace |
| 5,702,305 A | 12/1997 | Norman et al. |
| 5,703,951 A | 12/1997 | Dolphin |
| 5,720,663 A | 2/1998 | Nakatani et al. |
| 5,724,030 A | 3/1998 | Urbas et al. |
| 5,727,230 A | 3/1998 | Fujioka |
| 5,731,801 A | 3/1998 | Fukuzaki |
| 5,738,583 A | 4/1998 | Comas et al. |
| 5,739,814 A | 4/1998 | Ohara et al. |
| 5,743,801 A | 4/1998 | Welander |
| 5,748,731 A | 5/1998 | Shepherd |
| 5,761,485 A | 6/1998 | Munyan |
| 5,788,283 A | 8/1998 | Adler |
| 5,823,782 A | 10/1998 | Marcus et al. |
| 5,836,616 A | 11/1998 | Cooper |
| 5,841,878 A | 11/1998 | Arnold et al. |
| 5,853,327 A | 12/1998 | Gilboa |
| 5,855,001 A | 12/1998 | Doederlein et al. |
| 5,855,483 A | 1/1999 | Collins et al. |
| 5,855,513 A | 1/1999 | Lam |
| 5,877,458 A | 3/1999 | Flowers |
| 5,882,007 A | 3/1999 | Gay |
| 5,898,434 A | 4/1999 | Small et al. |
| 5,914,707 A | 6/1999 | Kono |
| 5,938,726 A | 8/1999 | Reber et al. |
| 5,941,769 A | 8/1999 | Order |
| 5,944,533 A | 8/1999 | Wood |
| 5,949,643 A | 9/1999 | Batio |
| 5,959,281 A | 9/1999 | Domiteaux |
| 5,961,386 A | 10/1999 | Sawaguchi |
| 5,971,855 A | 10/1999 | Ng |

| | | | |
|---|---|---|---|
| 5,976,018 A | 11/1999 | Druckman | |
| 5,982,736 A | 11/1999 | Pierson | |
| 5,986,651 A | 11/1999 | Reber et al. | |
| 5,991,693 A | 11/1999 | Zalewski | |
| 6,040,773 A | 3/2000 | Vega et al. | |
| 6,042,009 A | 3/2000 | Barrett et al. | |
| 6,042,478 A | 3/2000 | Ng | |
| 6,045,043 A | 4/2000 | Bashan et al. | |
| 6,052,117 A | 4/2000 | Ohara et al. | |
| 6,056,618 A | 5/2000 | Larian | |
| 6,061,656 A | 5/2000 | Pace | |
| 6,102,397 A | 8/2000 | Lee et al. | |
| 6,107,988 A | 8/2000 | Phillipps | |
| 6,120,379 A | 9/2000 | Tanaka et al. | |
| 6,161,762 A | 12/2000 | Bashan et al. | |
| 6,200,216 B1 | 3/2001 | Peppel | |
| 6,206,700 B1 | 3/2001 | Brown et al. | |
| 6,246,927 B1 | 6/2001 | Dratman | |
| 6,254,477 B1 | 7/2001 | Sasaki et al. | |
| 6,254,486 B1 | 7/2001 | Mathieu et al. | |
| 6,267,678 B1 | 7/2001 | Kubo et al. | |
| 6,280,323 B1 * | 8/2001 | Yamazaki et al. | 463/4 |
| 6,314,409 B2 | 11/2001 | Schneck et al. | |
| 6,314,483 B1 | 11/2001 | Goto et al. | |
| 6,325,292 B1 | 12/2001 | Sehr | |
| 6,331,145 B1 | 12/2001 | Sity et al. | |
| 6,352,478 B1 | 3/2002 | Gabai et al. | |
| 6,354,940 B1 | 3/2002 | Itou et al. | |
| 6,361,396 B1 | 3/2002 | Snyder et al. | |
| 6,364,735 B1 | 4/2002 | Bristow et al. | |
| 6,371,854 B1 | 4/2002 | Ikeda et al. | |
| 6,375,566 B1 | 4/2002 | Yamada | |
| 6,398,651 B1 | 6/2002 | Yamada | |
| 6,404,339 B1 | 6/2002 | Eberhardt | |
| 6,411,213 B1 | 6/2002 | Vega et al. | |
| 6,446,966 B1 | 9/2002 | Crozier | |
| 6,461,242 B2 | 10/2002 | Takeda et al. | |
| 6,464,503 B1 | 10/2002 | Heit et al. | |
| 6,468,162 B1 | 10/2002 | Nakamura | |
| 6,471,420 B1 | 10/2002 | Maekawa et al. | |
| 6,551,165 B2 | 4/2003 | Smirnov | |
| 6,611,199 B1 | 8/2003 | Geiszler et al. | |
| 6,612,501 B1 | 9/2003 | Woll et al. | |
| 6,620,024 B2 | 9/2003 | Choi | |
| 6,629,019 B2 | 9/2003 | Legge et al. | |
| 6,631,351 B1 | 10/2003 | Ramachandran et al. | |
| 6,634,949 B1 | 10/2003 | Briggs et al. | |
| 6,650,870 B2 | 11/2003 | White et al. | |
| 6,682,387 B2 | 1/2004 | Choi | |
| 6,682,392 B2 | 1/2004 | Chan | |
| 6,688,973 B2 | 2/2004 | Satloff et al. | |
| 6,709,336 B2 | 3/2004 | Siegel et al. | |
| 6,719,206 B1 | 4/2004 | Bashan et al. | |
| 6,726,485 B2 | 4/2004 | Marcus et al. | |
| 6,729,881 B2 | 5/2004 | Marcus et al. | |
| 6,729,934 B1 | 5/2004 | Driscoll et al. | |
| 6,735,324 B1 | 5/2004 | McKinley et al. | |
| 6,736,694 B2 | 5/2004 | Hornsby et al. | |
| 6,739,874 B2 | 5/2004 | Marcus et al. | |
| 6,749,507 B2 | 6/2004 | Kutaragi et al. | |
| 6,755,655 B2 | 6/2004 | Marcus et al. | |
| 6,761,637 B2 | 7/2004 | Weston et al. | |
| 6,772,121 B1 | 8/2004 | Kaneko | |
| 6,773,325 B1 | 8/2004 | Mawle et al. | |
| 6,773,351 B2 | 8/2004 | Brown | |
| 6,822,154 B1 | 11/2004 | Thai | |
| 6,835,131 B1 | 12/2004 | White et al. | |
| 6,835,135 B1 | 12/2004 | Silverbrook et al. | |
| 6,877,096 B1 | 4/2005 | Chung et al. | |
| 6,905,391 B2 | 6/2005 | Soto et al. | |
| 6,923,721 B2 | 8/2005 | Luciano et al. | |
| 6,967,566 B2 | 11/2005 | Weston et al. | |
| 7,006,786 B2 | 2/2006 | Marcus et al. | |
| 7,018,213 B2 | 3/2006 | Marcus et al. | |
| 7,029,283 B2 | 4/2006 | Marcus et al. | |
| 7,029,400 B2 | 4/2006 | Briggs | |
| 7,040,898 B2 | 5/2006 | Marcus et al. | |
| 7,040,982 B1 * | 5/2006 | Jarvis et al. | 463/9 |
| 7,050,754 B1 | 5/2006 | Marcus et al. | |
| 7,057,492 B2 | 6/2006 | Jackson et al. | |
| 7,081,033 B1 | 7/2006 | Mawle et al. | |
| 7,118,482 B2 | 10/2006 | Ishihara et al. | |
| 7,147,561 B2 | 12/2006 | Takeuchi | |
| 2001/0029147 A1 | 10/2001 | Hornsby | |
| 2001/0034257 A1 | 10/2001 | Weston | |
| 2001/0039206 A1 | 11/2001 | Peppel | |
| 2001/0049248 A1 | 12/2001 | Choi | |
| 2002/0000062 A1 | 1/2002 | Smirnov | |
| 2002/0028710 A1 | 3/2002 | Ishihara et al. | |
| 2002/0040929 A1 | 4/2002 | Bramucci | |
| 2002/0052238 A1 | 5/2002 | Muroi | |
| 2002/0077024 A1 | 6/2002 | Choi | |
| 2002/0077180 A1 | 6/2002 | Swanberg et al. | |
| 2002/0077182 A1 | 6/2002 | Swanberg et al. | |
| 2002/0090985 A1 | 7/2002 | Tochner et al. | |
| 2002/0090992 A1 | 7/2002 | Legge | |
| 2002/0093426 A1 | 7/2002 | Jackson | |
| 2002/0155893 A1 | 10/2002 | Swanberg et al. | |
| 2002/0193157 A1 | 12/2002 | Yamada et al. | |
| 2003/0003839 A1 | 1/2003 | Lin | |
| 2003/0037075 A1 | 2/2003 | Hannigan et al. | |
| 2003/0064812 A1 | 4/2003 | Rappaport | |
| 2003/0096652 A1 | 5/2003 | Siegel et al. | |
| 2003/0100375 A1 | 5/2003 | Wakae et al. | |
| 2003/0134679 A1 | 7/2003 | Siegel et al. | |
| 2003/0171984 A1 | 9/2003 | Wodka | |
| 2004/0002387 A1 | 1/2004 | Grady | |
| 2004/0006509 A1 | 1/2004 | Mannik | |
| 2004/0092311 A1 | 5/2004 | Weston et al. | |
| 2004/0111164 A1 | 6/2004 | Stohrer et al. | |
| 2004/0122731 A1 | 6/2004 | Mannik | |
| 2004/0152520 A1 | 8/2004 | Shinoda | |
| 2004/0152521 A1 | 8/2004 | Shinoda | |
| 2004/0166913 A1 | 8/2004 | Shinoda | |
| 2004/0192434 A1 | 9/2004 | Walker et al. | |
| 2004/0198158 A1 | 10/2004 | Driscoll | |
| 2004/0214642 A1 | 10/2004 | Beck | |
| 2004/0229696 A1 | 11/2004 | Beck | |
| 2004/0259465 A1 | 12/2004 | Wright | |
| 2005/0009610 A1 | 1/2005 | Miyamoto et al. | |
| 2005/0059483 A1 | 3/2005 | Borge | |
| 2005/0101381 A1 | 5/2005 | Hattori | |
| 2005/0143173 A1 | 6/2005 | Barney | |
| 2005/0148281 A1 | 7/2005 | Sanchez-Castro et al. | |
| 2005/0266907 A1 | 12/2005 | Weston | |
| 2005/0273553 A1 | 12/2005 | Boucard | |
| 2006/0003843 A1 | 1/2006 | Kobayashi | |
| 2006/0054679 A1 | 3/2006 | Ruping | |
| 2006/0093142 A1 * | 5/2006 | Schneier et al. | 380/251 |
| 2006/0104423 A1 | 5/2006 | Heidloff et al. | |
| 2006/0246403 A1 | 11/2006 | Monpouet et al. | |
| 2007/0082720 A1 | 4/2007 | Bradbury et al. | |
| 2007/0087837 A1 | 4/2007 | Bradbury et al. | |
| 2007/0087838 A1 | 4/2007 | Bradbury et al. | |
| 2007/0087839 A1 | 4/2007 | Bradbury et al. | |
| 2007/0093293 A1 * | 4/2007 | Osnato | 463/36 |
| 2008/0222201 A1 | 9/2008 | Chen et al. | |
| 2009/0063542 A1 | 3/2009 | Bull et al. | |
| 2009/0203446 A1 | 8/2009 | Bradbury et al. | |

FOREIGN PATENT DOCUMENTS

| | | |
|---|---|---|
| DE | 3813779 | 11/1989 |
| DE | 4207534 | 9/1993 |
| EP | 0134815 | 3/1985 |
| EP | 0147099 | 7/1985 |
| EP | 0281257 | 9/1988 |
| EP | 0310766 | 4/1989 |
| EP | 0455315 | 11/1991 |
| EP | 0471572 | 2/1992 |
| EP | 0492569 | 7/1992 |
| EP | 0567687 | 11/1993 |
| EP | 0572710 | 12/1993 |
| EP | 0606790 | 7/1994 |
| EP | 0636974 | 2/1995 |
| EP | 0775001 | 5/1997 |
| EP | 0790848 | 8/1997 |
| EP | 1036580 | 9/2000 |
| EP | 1197251 | 4/2002 |

| | | |
|---|---|---|
| EP | 1256365 | 11/2002 |
| EP | 1319430 | 6/2003 |
| EP | 1350215 | 10/2003 |
| EP | 1536388 | 6/2005 |
| EP | 1675662 A2 | 7/2006 |
| FR | 2563745 | 11/1985 |
| FR | 2607400 | 6/1988 |
| FR | 2860985 A1 | 4/2005 |
| GB | 2103943 | 3/1983 |
| GB | 2210722 | 6/1989 |
| GB | 2211705 | 7/1989 |
| GB | 2237514 | 5/1991 |
| GB | 2344257 A | 5/2000 |
| IL | 100451 | 8/1994 |
| JP | 54062033 | 5/1979 |
| JP | 03228216 | 10/1991 |
| JP | 04322686 | 11/1992 |
| JP | 05177056 | 7/1993 |
| JP | 06243305 | 9/1994 |
| JP | 07210635 | 8/1995 |
| JP | 07323159 | 12/1995 |
| JP | 11-244537 | 9/1999 |
| JP | 2002136766 | 5/2002 |
| JP | 2002153669 | 5/2002 |
| JP | 2003047771 | 2/2003 |
| JP | 2003310812 | 11/2003 |
| SU | 878324 | 11/1981 |
| SU | 1077615 | 3/1984 |
| WO | 84/02995 | 8/1984 |
| WO | 88/05951 | 8/1988 |
| WO | 95/26790 A1 | 10/1995 |
| WO | 96/03188 | 2/1996 |
| WO | 97/14112 | 4/1997 |
| WO | 97/23060 A1 | 6/1997 |
| WO | 98/24527 | 6/1998 |
| WO | 98/35332 | 8/1998 |
| WO | 99/30455 | 6/1999 |
| WO | 99/30911 | 6/1999 |
| WO | 99/53449 | 10/1999 |
| WO | 99/59103 | 11/1999 |
| WO | 00/31676 | 6/2000 |
| WO | 01/03788 | 1/2001 |
| WO | 01/08772 | 2/2001 |
| WO | 01/48580 | 7/2001 |
| WO | 02/01494 | 1/2002 |
| WO | 02/11836 A1 | 2/2002 |
| WO | 02/47013 | 6/2002 |
| WO | 02/50632 | 6/2002 |
| WO | 02/088904 | 11/2002 |
| WO | 03/018156 | 3/2003 |
| WO | 03/028832 | 4/2003 |
| WO | 03/077454 | 9/2003 |
| WO | 03/077569 | 9/2003 |
| WO | 2004/002589 | 1/2004 |
| WO | 2004/087271 | 10/2004 |
| WO | 2005/013237 | 2/2005 |
| WO | 2005/031678 | 4/2005 |
| WO | 2005/039714 A3 | 5/2005 |
| WO | 2006/036851 | 4/2006 |
| WO | 2006/039339 | 4/2006 |
| WO | 2007/033142 A3 | 3/2007 |
| WO | 2007/033155 A3 | 3/2007 |
| WO | 2007/033301 A3 | 3/2007 |
| WO | 2007/033302 A3 | 3/2007 |
| WO | 2007/033303 A3 | 3/2007 |

OTHER PUBLICATIONS

Pages 338 and 339 from the "RFID Handbook," by Klaus Finkenzeller. Original German second edition © 1999 Carl Hanser Verlag, Munich/FRG. English translation © 2003 John Wiley & Sons, Ltd.

Maxell press release for SEGA Arcade Game Center. Games shown therein © 2001, 2002 SEGA-AM2/SEGA.

Web page regarding "World Cup Championship Football" game by SEGA Enterprises, Inc. Downloaded Sep. 26, 2005 from www.highwaygames.com/body.php3?action=mach_view&view=machine_id=2675. © 1999-2001 Highwaygames.

SEGA Corporation Annual Report for 2002.

Press release titled "StatCard Entertainment Unveils XAction Skate at Toys 'R Us Time Square" by StatCard Entertainment, Inc. dated Jan. 21, 2002.

Web page describing "Pokeman Card e Booster Packs" as planned for release in 2002. Downloaded Oct. 1, 2005 from www.icv2.com/articles/news/1131.html.

"StatCard Company Background and Product Information," dated May 29, 2002, from www.statcard.com.

Web page describing Olympus Optical e-Reader and e-Reader cards with a U.S. release date of Sep. 16, 2002. Downloaded Oct. 1, 2005 from www.planetgamecube.com/hardware.cfm?action=profile&id=11.

Web page describing Pokemon E-Cards Trading Card Game. Page created Oct. 14, 2002. Downloaded Oct. 1, 2005 from www.bbc.co.uk/dna/h2g2/A821675.

Japanese Internet class handout including discussion of trading cards with RFID. Handout dated Apr. 14, 2003.

"The Smart Jigsaw Puzzle Assistant: Using RFID Technology for Building Augmented Real-World Games" by Jürgen Bohn. Downloaded Sep. 28, 2005 from www.ipsi.fraunhofer.de/ambiente/pervasivegaming/papers/bohn_smartjigsaw_2004_final_perv2004ws.pdf.

Blog entry "RFID in Japan: RFID Arcade Games." Entry posted Jun. 20, 2005. Downloaded from http://ubiks.net/local/blog/jmt/archives3/003971.html on Jul. 24, 2006.

Japanese web page on electronic trading card games. Downloaded Sep. 26, 2005 from www.sangokushi-taisen.com/game_menu.html.

Blog entry "RFID Arcade Games: RFIDbuzz.com" dated Jun. 20, 2005. Downloaded Sep. 26, 2005 from http://www.rfidbuzz.com/news/2005/rfid_arcade_games.html.

Blog entry "Chipped Card Games" dated Sep. 7, 2005. Downloaded Sep. 26, 2005 from www.kotaku.com/gaming/arcade/chipped-card-games-124132.php.

Blog entries "Trends: Physical Organization" dated Sep. 2005. Downloaded Oct. 1, 2005 from www.byz.org/~rbanks/.

Press release for Serene mobile phone, Samsung Electronics and Bang & Olufsen, Oct. 2005.

Blog entry "Sony the Eye of Judgment" battle cards. Posted May 12, 2006 by Justin Calvert. Downloaded May 18, 2006 from http://www.gamespot.com/ps3/action/theeyeofjudgment/news.html?sid=6151233.

Blog entry "Sony is re-imagining the way we play old-fashioned card games with one title for the forthcoming Playstation 3 (PS3) game console" Posted May 15, 2005 by Alfred Hermida. Downloaded May 15, 2006 from http//news.bbc.co.uk/1/hi/technology/4768829.stm.

Article "Stan Lee's Superhero rings pack a solid multimedia punch" dated Sep. 2005. Downloaded Sep. 12, 2005 from www.kidscreen.com.

Tanks http://web.archive.org/web/20041020054936/www.crazymonkeygames.com/tanks.html; dated Sep. 13, 2007; 4 pages.

U.S. Appl. No. 60/184,128, filed Feb. 2, 2000.
U.S. Appl. No. 60/241,893, filed Oct. 20, 2000.
US 5,009,603, 04/1991, Fong et al. (withdrawn)

* cited by examiner

VIDEO GAME SYSTEM AND METHODS OF OPERATING A VIDEO GAME

CROSS-REFERENCE TO RELATED APPLICATIONS

This application is a continuation of prior U.S. patent application Ser. No. 11/530,863, filed Sep. 11, 2006, now U.S. Pat. No. 7,883,420 entitled "Video Game Systems," which is based upon and claims priority under 35 USC §119 (e) to the following U.S. provisional applications, which are incorporated herein by reference in their entireties for all purposes: Ser. No. 60/716,563, entitled "Trading Card Utilizing Radio-Frequency Identification," filed on Sep. 12, 2005; Ser. No. 60/717,540, entitled "Trading Card Utilizing Radio-Frequency Identification," filed on Sep. 14, 2005; Ser. No. 60/722,143, entitled "Trading Card Utilizing Radio-Frequency Identification," filed on Sep. 29, 2005; Ser. No. 60/730,225, entitled "Trading Card Utilizing Radio-Frequency Identification," filed on Oct. 24, 2005; Ser. No. 60/733,653, entitled "Trading Card Utilizing Radio-Frequency Identification," filed on Nov. 4, 2005; Ser. No. 60/765,274, entitled "Trading Card Utilizing Radio-Frequency Identification," filed on Feb. 3, 2006; Ser. No. 60/772,314, entitled "Trading Card Utilizing Radio-Frequency Identification," filed on Feb. 10, 2006; Ser. No. 60/797,958, entitled "Trading Card Utilizing Radio-Frequency Identification," filed on May 5, 2006; and Ser. No. 60/802,607, entitled "Trading Card Utilizing Radio-Frequency Identification," filed on May 22, 2006, and which also claims priority under 35 USC §120 to the following U.S. design applications, which are incorporated herein by reference in their entireties for all purposes: Ser. No. 29/253,669, entitled "Game Console," filed on Feb. 10, 2006; Ser. No. 29/255,110, entitled "Game Console," filed on Mar. 3, 2006; and Ser. No. 29/259,080, entitled "Game Controller," filed on May 1, 2006. Each of the foregoing applications is hereby incorporated by reference.

The following applications claim benefit to the same parent applications recited above, include similar disclosures as the present application, and are incorporated herein by reference in their entireties for all purposes: Ser. No. 11/530,832, entitled "Video Game Consoles," filed on Sep. 11, 2006; Ser. No. 11/530,856, entitled "Methods of Playing Video Games," filed on Sep. 11, 2006; Ser. No. 11/530,860, entitled "Video Game Controllers," filed on Sep. 11, 2006; and Ser. No. 11/530,862, entitled "Video Game Media," filed on Sep. 11, 2006.

BACKGROUND

The present disclosure relates to video games. More particularly, the present disclosure relates to video game systems, video game consoles, media for use with video game consoles, video game controllers, and methods of playing video games.

Video games are enjoyed by children and adults alike, both in the arcade and home environments. In the home environment, video games are often played on video game console systems. Such systems generally incorporate video games embodied in media in the form of cartridges (e.g., SUPER NINTENDO ENTERTAINMENT SYSTEM®, SEGA GENESIS™), CD-ROMs (e.g., SONY PLAYSTATION®), or DVDs (e.g., MICROSOFT X-BOX™, NINTENDO GAMECUBE®).

The following patent documents are incorporated herein by reference in their entireties for all purposes: U.S. patent application Ser. Nos. 60/184,128, 09/472,042, and 10/989,837; U.S. Patent Application Publication Nos. 2002/0052238, 2002/0077182, 2004/0152521, 2004/0214642, 2005/0143173, and 2006/0054679; U.S. Pat. Nos. 4,764,666, 5,190,285, 5,689,561, 5,743,801, 5,853,327, 6,161,762, 6,200,216, 6,468,162, 6,761,637, 6,773,325, 7,018,213, 7,057,492, and 7,081,033; International Publication No. WO 2006/036851; European Patent Application Publication No. EPO492569; and Japanese Patent Application Publication No JP07-323159.

In the event that any of the incorporated references listed in the previous paragraph define a term or terms in a manner inconsistent with either the disclosure of the present application or with any of the other incorporated references, the term or terms as used therein only control with respect to the patent document in which the term or teems are defined. Stated differently, a patentee of any one of the aforementioned incorporated references listed in the previous paragraph, when acting as his/her own lexicographer, does so only with respect to the reference in which the term or terms are defined. Accordingly, any such defined term or terms do not, in any way, define the same or similar term or terms used in the present application or in any of the other aforementioned or later-mentioned references.

SUMMARY

Video game systems are provided. In some embodiments, a video game system for executing instructions according to a video game contained on an item of first media include: an item of second media containing data defining an aspect of the video game; and a video game console including a housing, a first media device supported by the housing, a second media device supported by the housing, and a control unit supported by the housing and configured to control the first media device to read the item of first media and to control the second media device to read the item of second media.

Some video game systems include: a first type of media containing instructions executable according to one or more video games, the first type of media configured to be received and read by a video game console; and a second type of media including data relating to the one or more video games, the second type of media being of a different type than the first type of media and configured to be wirelessly read by the video game console, wherein the second type of media includes a first subset including data relating to a first aspect of the video games and a second subset including data relating to a second aspect of the one or more video games.

DETAILED DESCRIPTION

Figure 1:
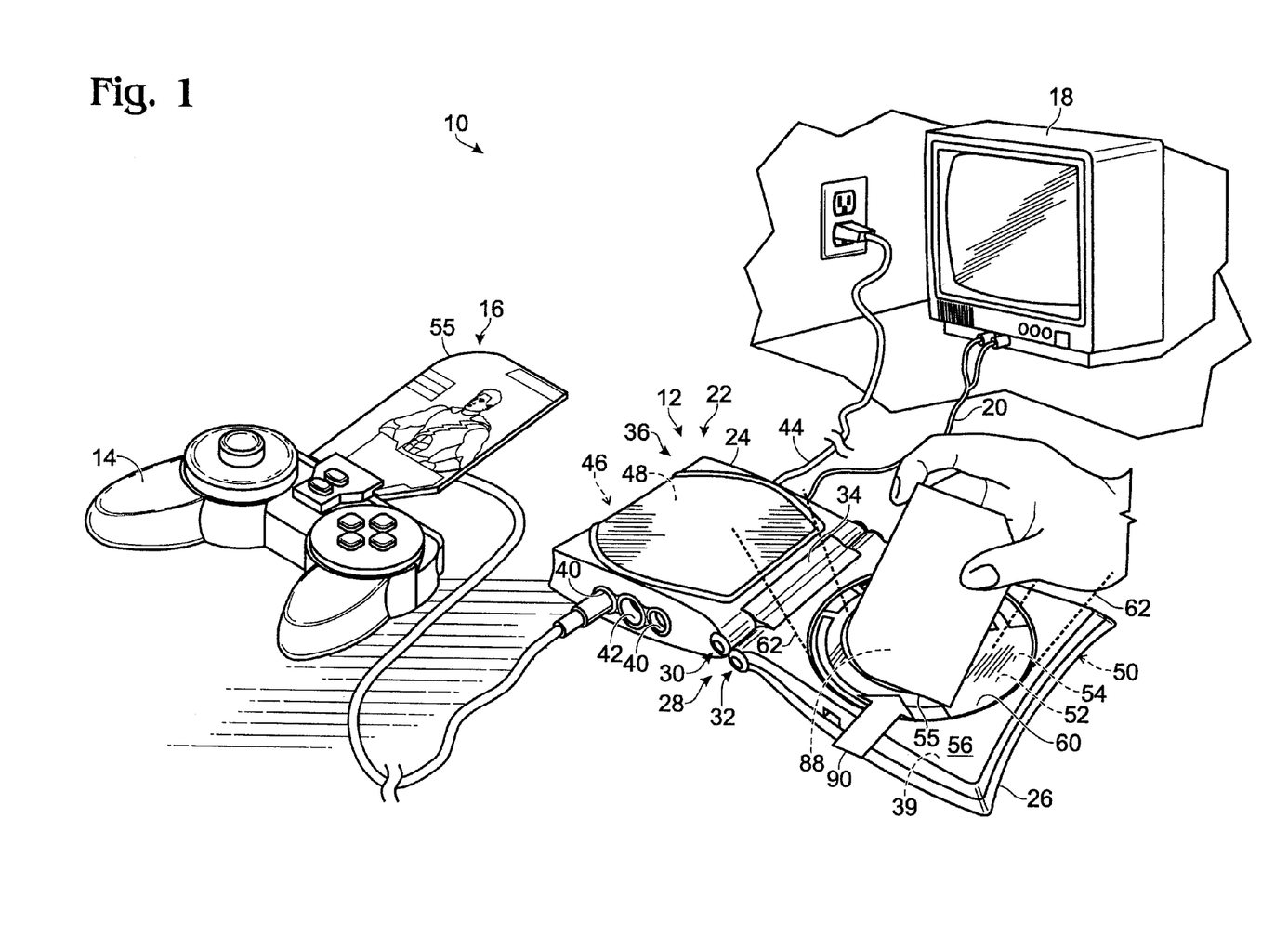
FIG. 1 is a perspective view of a video game system including a video game console, a video game controller, and an item of media in the form of a game card, the system shown in conjunction with a television.

A video game system is shown in FIG. 1 and generally indicated at 10. Video game systems may include a video game console 12, one or more video game controllers 14, and one or more items of media 16. As shown, systems 10 may be configured to be used in conjunction with a television, or other form of display screen, 18. For example, consoles may include, or be adapted to connect to, an audio/video cable 20 for transmitting audio/video data to television 18. Additionally or alternatively, video game consoles may be configured to wirelessly transmit audio/visual data to an associated display screen and/or speakers. Additionally or alternatively, video game consoles may include an integral display screen.

Figure 2:
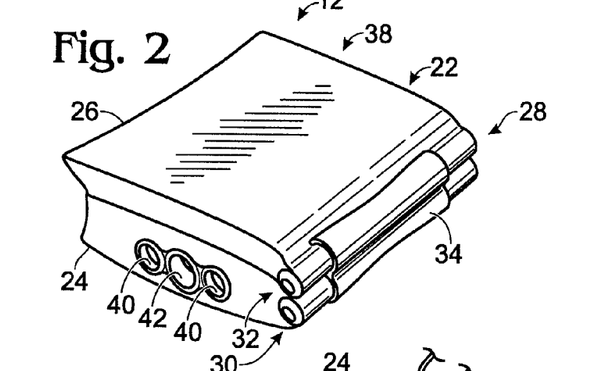
FIG. 2 is a perspective view of a video game console shown in a closed configuration.
Figures 3, 4:
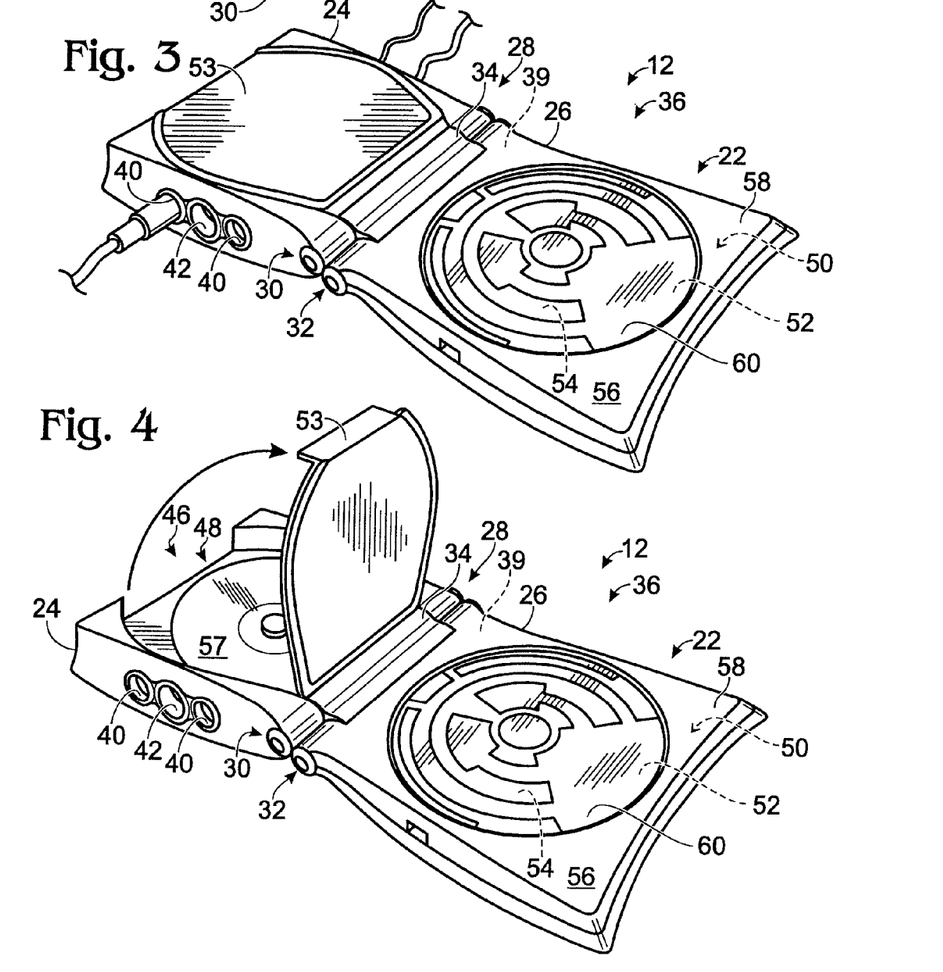
FIG. 3 is a perspective view of a video game console shown in an open configuration.
FIG. 4 is a perspective view of a video game console including an optical media device, the video game console and the optical media device both shown in an open configuration.

As illustrated in FIGS. 1-4, video game consoles 12 may include a housing 22. In some embodiments, the housing has a first portion 24 hingedly connected to a second portion 26. For example, a hinge member 28 may functionally connect the first and second portions. Hinge member 28 may include a first hinge 30 supported by the first portion of the housing and a second hinge 32 supported by the second portion of the housing and connected to and spaced apart from the first hinge by a connecting piece 34. Console 12 may therefore be reconfigured between an open configuration 36 where the first and second portions are generally co-planar (as shown in FIGS. 1 and 3-4) and a closed configuration 38 where the first and second portions are generally parallel and facing each other (as shown in FIG. 2).

Video game consoles may include a control unit 39 supported by the housing. The control unit may include various electronic components necessary to functionally operate the console and the components thereof including peripheral components that may be attached to the console for performing various functions. For example the control unit may include, but is neither required to include nor limited to, a processor such as a 32-bit SUNPLUS™ SPG290 processor running at 150 MHz, memory including RAM and/or ROM, etc.

Video game consoles 12 may also include various ports and/or connectors for peripheral devices such as video game controllers 14. For example, as shown in FIGS. 1-4, console 12 may include two controller ports 40 configured to receive and provide communication between console 12 and controllers 14; however, consoles may be configured for any number of video game controllers, whether fewer than or greater than two, and in some embodiments consoles and controllers may be configured for wireless communication with each other. Additionally, consoles may include ports for attachment of headphones, speakers, microphones, etc.

Consoles 12 may include an on/off, or power button, 42 and a power cord 44 for attachment to a supply of power. Though illustrated as being configured for receiving power from a standard North American 120 VAC power outlet, video game consoles may receive power from any suitable source including a battery or batteries. In some embodiments, a power cord may be integral to the console, while in others, the console may include a jack for receiving a power cord.

Video game consoles according to the present disclosure may include one or more media devices for receiving and reading and/or transmitting and writing data from and/or to various types of media including, but not limited to, optical discs such as CDs and DVDs, floppy disks, smart cards, cartridges, flash cards, memory sticks, magnetic tapes, electromagnetic transponders, radio frequency transponders, or any other media capable of storing data. Transfer of data from the console to media or between the console and media may be implemented via a hard connection such as via wired contacts in a game cartridge, optically such as via an optical laser or infrared device, wirelessly such as via radio waves or magnetic fields, or any other suitable method of transferring data. Nonexclusive examples of media devices that may be incorporated into consoles according to the present disclosure include, but are not limited to, optical drives, floppy disk drives, cartridge readers, proximity devices, electromagnetic readers, radio frequency readers, microwave frequency readers, infrared readers, bar code readers, magnetic strip readers, etc. The present disclosure is not solely limited to the illustrated and/or discussed examples.

In some embodiments, media devices may be of a type where a user can simply locate or position an item of media relative to the media device for a length of time (e.g., less than five seconds), and the media device will functionally read the media. Locate, as used in this context, may include, but is not limited to, pass, hold, place, swipe, scam, position, etc. Such devices may be described as proximity devices. Radio frequency readers are an example of this type of device. Bar code readers, magnetic strip readers, infrared light devices such as narrow beam infra read devices, etc. are also all examples of this type of device.

As used herein, radio frequency devices, also known as RFID (radio frequency identification) devices are not limited solely to operating within the radio frequency range. Rather, as is known in the art, RFID has become a term-of-art representing various devices that use electromagnetic fields (e.g., in the approximately 10 Hz to 20 kHz range) to wirelessly read and/or read and write data from and/or from and to corresponding transponders capable of storing data. Various configurations of such devices are known in the art and may be further developed in the future, and such devices may be incorporated into video game systems according to the present disclosure.

In the illustrated embodiment, console 12 includes a first media device 46 in the faun of an optical drive 48 and a second media device 50 in the form of a radio frequency reader, or proximity device, 52 configured to read and write data from and to associated radio frequency transponders embodied in items of media 16 in the form of game cards 55; however, fewer than or greater than two media devices may be provided. In embodiments including more than one media device, such media devices may be of the same type or may be of a different type from each other. An exemplary optical drive may be a SONY KSM900ASI CD drive. An exemplary radio frequency reader may be manufactured by INNOVISION, and an exemplary radio frequency transponder may be an IRT-1 chip manufactured by INNOVISION.

First and second media devices 46, 50 may be supported by housing 22. In the illustrated embodiment, optical drive 48 is supported by first portion 24 of housing 22 and radio frequency reader 52 is supported by second portion 26 of housing 22; however, any suitable configuration may be provided. Optical drive 48 is illustrated as including a hinged cover 53, shown in an open configuration and revealing an optical disc 57 in FIG. 4. Other configurations of optical drives are equally within the scope of the present disclosure.

Video game consoles according to the present disclosure may also include a light source 54 supported by housing 22, e.g., housed within housing 22. In such embodiments, an outer surface 56 of housing 22 may include an opaque portion 58 and a translucent portion 60. As such, the control unit may be configured to illuminate the translucent portion with the light source. In some embodiments, the control unit may further be configured to illuminate the translucent portion with the light source when a media device supported by the housing is activated, e.g., when radio frequency reader 52 communicates with a corresponding radio frequency transponder embodied in an item of media 16, as generally indicated by the dashed lines at 62 in FIG. 1. Other configurations of light sources including LEDs and the like may equally be incorporated into consoles according to the present disclosure, and may be configured to be illuminated in conjunction with various functions of a video game system.

As mentioned, video game consoles may include, or be adapted to connect to, an audio/video cable 20 for transmission of audio/visual data and/or consoles may include an integral speaker and/or integral display screen. Accordingly, consoles may be configured to transmit an audio signal to an associated speaker or speakers in response to various functions of video game systems including, but not limited to, sounds generated by the software associated with a video game embodied in an item of media, sounds generated by software associated with control of the console hardware, etc. In some embodiments, consoles may be configured to transmit or send an audio signal when a media device is activated, e.g., when second media device 50 is activated to read data from an item of media and/or to confirm that a media device has successfully read data from an item of media.

In the illustrated embodiment, console 12 is configured to send an audio signal to an associated speaker (e.g., integral or connected to television 18) when radio frequency reader 52 effectively communicates with a corresponding radio frequency transponder embodied within an item of media 16. Additionally or alternatively, consoles may include an integral speaker supported by the housing, and consoles may be configured to transmit or send an audio signal to the integral speaker. Various other functions beyond those described may also trigger consoles to send audio signals to associated speakers, whether external or integral to consoles, including, but not limited to, sounds associated with various video games, start-up routines of a system, etc.

In addition to the illustrated embodiments, consoles according to the present disclosure may be configured to connect to a local area network, a wide area network, the internet, etc. Accordingly, consoles may include USB, FIREWIRE, or any other appropriate type of connection for connecting to a computing device, or any other suitable device, to send and/or receive data. Additionally or alternatively, consoles may incorporate such computing devices within the housing of the consoles themselves and be configured for hard-wired connection (e.g., via Ethernet) or for wireless connection (e.g., WiFi).

Figure 5:
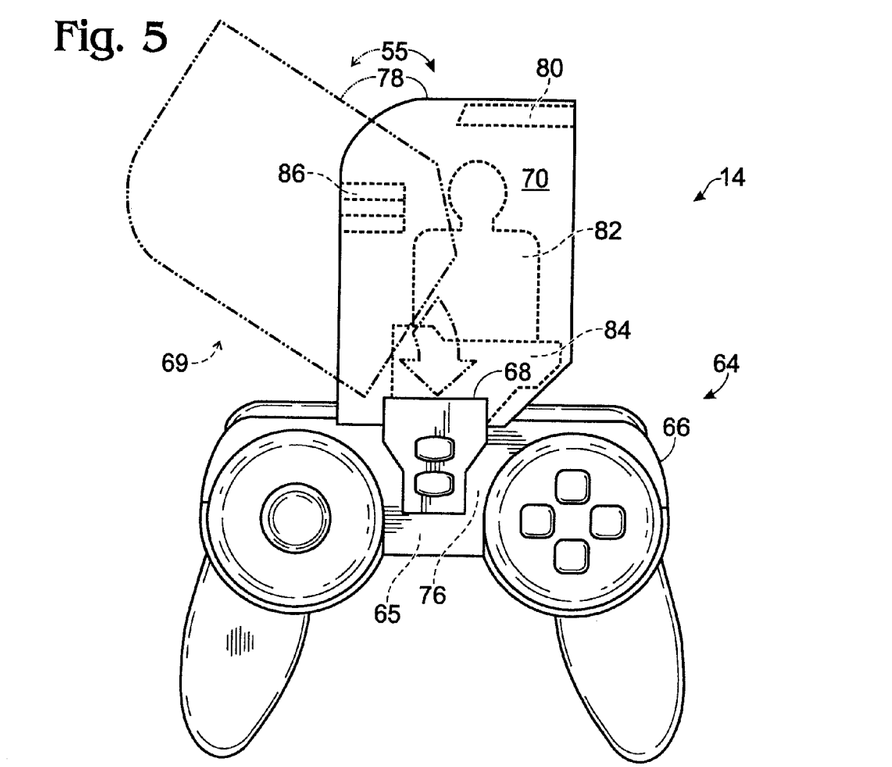
FIG. 5 is a front view of a video game controller including a game card holder, the game card holder being shown holding a game card.

Turning now to FIG. 5, a non-exclusive illustrative video game controller 14 is illustrated. As shown, controllers may include various user controls 64 supported by a housing 66 and configured to be manipulated by a user for interacting with video game consoles (e.g., for controlling a character of a video game, for navigating menus and screens associated with a video game, etc.). Controllers may also include a processor 65, such as a SUNPLUS™ SPC11024A processor.

Illustrated controller 14 also includes a holder 68 supported by housing 66. Holders according to the present disclosure may be configured to receive and retain an item of media associated with a video game and/or a video game system. For example, in the depicted embodiment, holder 68 is configured to receive and retain an item of media in the form of a game card 55. FIG. 5 illustrates a game card in dash-dot-dot lines being inserted into the holder, as indicated at 69.

In the illustrated embodiment, holder 68 is supported by the housing at a generally front and top location so that when a user of controller 14 is holding the controller in an intended manner during use, the user can easily observe a front face 70 of game card 55 when the game card is retained by the holder. Stated differently, the holder may be positioned on the housing so that a card, when retained by the holder, extends generally away from a user with face 70 facing toward the user, when the user is holding the controller in an intended manner. Stated differently yet again, the holder may be configured to receive and retain an item of media in the foam of a card having indicia related to a video game printed thereon, and the holder may be positioned on the housing so that the indicia, when the card is retained by the holder, is legible by a user.

Figure 6:
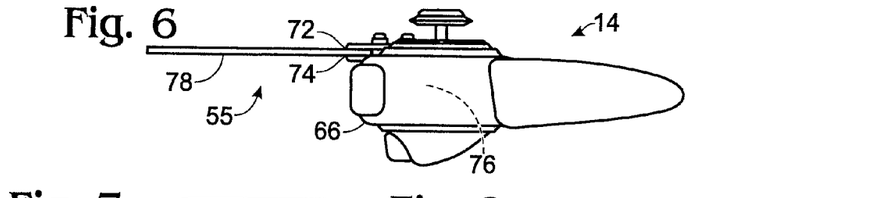
FIG. 6 is a left side view of a video game controller including a game card holder, the game card holder being shown holding a game card.

A holder according to the present disclosure may take any suitable form such that the holder is configured to receive and retain an item of media. In the illustrated embodiment shown in FIG. 6, holder 68 is configured to provide a friction fit for a game card 55. As such, holder 68 includes generally parallel engagement surfaces 72, 74, for engaging corresponding surfaces of a game card 55. For example, a game card may have a thickness equal to or slightly greater than a corresponding distance between engagement surfaces 72, 74. Accordingly, game cards may be, but are not required to be, constructed of a material that allows them to be at least slightly compressed when inserted into and retained by a holder of a controller. Additionally or alternatively, the holder may be constructed such that a distance between engagement surfaces expands when an item of media is received. Stated differently, surfaces 72, 74 may be biased toward a closed or card-holding position.

In some embodiments, the thickness of a game card may be approximately two and three-tenths millimeters, and the distance between the engagement surfaces of the holder may be approximately two to two and three-tenths millimeters; however, any appropriate thickness of game card and distance between the engagement surfaces of the holder may be incorporated into a controller according to the present disclosure. Game cards may be between two and three millimeters thick, between one and three millimeters thick, between one and two millimeters thick, or may be thinner or thicker than such stated ranges. Similarly, the distance between the engagement surfaces of the holder may be between two and three millimeters, between one and three millimeters, between one and two millimeters, or may be closer or further apart than such stated ranges.

In some embodiments of controllers, the holder may be described as a clip. Again, any configuration of a holder such that it is configured to generally receive and retain an item of media is within the scope of the present disclosure.

Additionally or alternatively, in some embodiments of controllers, a media device configured for reading and/or writing data from and/or to an item of media may be supported by the controller housing. For example, a controller may include a radio frequency reader, or proximity device, 76 configured to wirelessly read data from and/or write data to a corresponding radio frequency transponder embodied within an item of media such as a game card 55. Other types of media devices may equally be incorporated into controllers.

Additionally or alternatively, a controller and a console may form a single unit. That is, the controller may be integral to the console. In some such embodiments, a display screen may also be integral to the console, such that the controller, console and display screen form a single portable unit.

Figure 7:
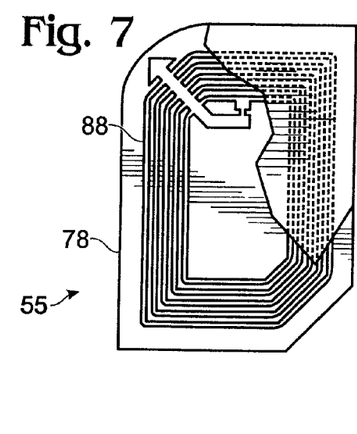
FIG. 7 is a partial cross-sectional front view of an item of media in the form of a game card with an embedded wireless data transponder.
Figure 8:
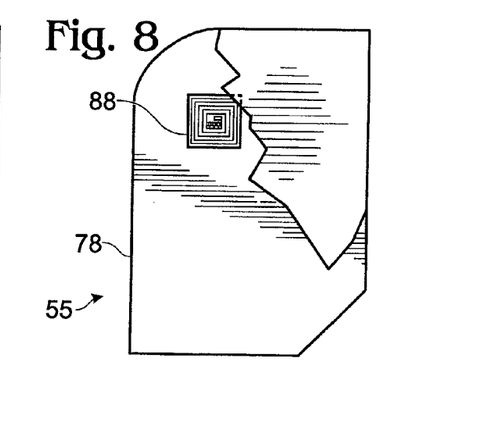
FIG. 8 is a partial cross-sectional front view of another item of media in the form of a game card with an embedded wireless data transponder.

As mentioned, media according to the present disclosure may be in the form of game cards 55. Cards 55 may be of any appropriate size and shape, and may include a housing 78 comprised of any suitable material, as shown in FIGS. 5-8. For example, housing 78 may be comprised of paper board, layers of paper board, cardstock, plastic, ceramic, or any other appropriate material. Housing 78 may be generally rectangular and approximately ninety millimeters by sixty-four millimeters and approximately two millimeters thick. In some embodiments, housing 78 may have one or more rounded corners as illustrated in FIGS. 5 and 7-8. Additionally or alternatively, a game card housing may have a truncated corner, for example opposite the rounded corner in the illustrated embodiments.

Housing 78 may be configured to receive indicia such as printed indicia on face 70. As illustrated in FIG. 5, face 70 may include various regions with indicia printed thereon. In one embodiment of a game card corresponding to a character of a video game, face 70 may include a first region 80 including indicia such as a name of the character, a second region 82 with indicia such as an image of the character, a third region 84 with indicia such as a story of the character, and a fourth region 86 with indicia such as attributes of the character. Other configurations may equally be used on media and game cards according to the present disclosure, and game cards are not limited to the illustrated and described embodiments.

Turning now to FIGS. 7-8, two embodiments of game cards 55 are illustrated including data storage devices in the form of radio frequency transponders 88 embodied therein. Transponders 88 may be passive transponders or they may be active transponders. That is, they may receive power from an associated radio frequency reader, or proximity device, or they may include their own power source such as batteries. Transponders 88 may be configured to be read from as well as written to by an associated radio frequency reader, or proximity device.

Transponders according to the present disclosure may be of any suitable size. As shown, the transponder illustrated in FIG. 7 is sized to generally extend near the perimeter of the game card, whereas the transponder illustrated in FIG. 8 is sized to generally be housed within a corner region of the game card. Sizes of transponders embodied within game cards may be dependent on such factors or variables as capacity of data storage required, relative distance to an associated reader required or desired to functionally communicate with the reader, level of technology achieved within the art at the time of manufacture, etc.

Referring back to FIG. 1, a game card 55 is illustrated in use with console 12. As game card 55 is swiped, passed, or otherwise located over or near second console portion 26, and thus proximity device 52, as indicated by the arrow at 90, transponder 88 will effectively communicate with proximity device 52. As discussed above, in response to effective communication between the transponder and the proximity device, light source 54 may illuminate translucent portion 60 as indicated by the dashed lines at 62.

Now that various physical components or elements of video game systems according to the present disclosure have been described, it may be appreciated that various types of data may be provided by, contained on, or embodied in, various types of media for use with the physical components discussed above. Such media including the data embodied thereon may equally be described as being a component or element of a video game system.

As mentioned, video game consoles may be configured to read data from and/or write data to various types of media. A first item of media, or a first type of media, may contain data and instructions executable according to a video game. In other words, the first item or type of media may include executable instructions such as source code, a game engine, middleware, and/or other appropriate instructions, software and/or game data necessary to provide an interactive video game via a video game console. In some embodiments, the first item of media may be an optical disc, such as a CD or DVD. In other embodiments, the first item of media may be a cartridge, a floppy disk, or any other suitable type of media.

A video game, the executable instructions of which may be provided on a first item of media, may be a fighting game, a racing game, a sports game such as a baseball game, a role-playing game, or any other appropriate type of video game including known types of video games as well as types of video games yet to be developed and implemented in present video game systems whether due to a limitation of technology or simply due to the imagination of video game designers.

Video game consoles according to the present disclosure may therefore include a media device specifically configured to receive and read the first media containing instructions according to a video game. As discussed above and illustrated in the figures, console 12 may include a first media device 46 in the form of an optical drive 48 configured to read optical disc 57. Accordingly first media device 46 may be said to be configured to receive and read first media containing instructions executable according to a video game. Stated differently, control unit 39 may be configured to control the first media device to read first media containing instructions executable according to a video game.

A second item of media may contain data defining an aspect of a video game. As used herein, an aspect of a video game may include, but is not limited to, a character, an attribute of a character, a game environment, and/or an attribute of a game environment, etc. In other words, while the first item of media, as used herein, may include data and executable instructions necessary to provide an interactive video game, the second item of media, as used herein, may include data corresponding to a component of the underlying video game provided by the first media. In second items of media containing data defining an attribute of a character or an attribute of an environment, the aspects defined thereon may be described as modifications to an aspect of a video game.

For example, in an embodiment where a first item of media provides a fighting game, a second item of media may define a fighter, i.e., may provide default data defining the fighter, such as, but neither required to include nor limited to, data defining appearance, strength, power, weapon capabilities, maneuver capabilities, health, endurance, stamina, constitution, mental prowess, etc. Additionally or alternatively, a second item of media may provide data defining one or more modifications to one or more attributes of a fighter that are different from any default data either provided by the first item of media or by a separate second item of media defining the fighter him/herself, such as, but not limited to, a particular weapon, a particular move (whether offensive or defensive, etc.) a particular strength level, a particular power level, a particular weapon, a particular maneuver, a particular appearance, a particular technique, a particular accessory, etc.

Similarly, in an embodiment where a first item of media provides a racing game, a second item of media may define a car or other vehicle, i.e., may provide default data defining the vehicle, such as, but neither required to include nor limited to, data defining appearance, speed, horsepower, torque, handling capabilities, etc. Additionally or alternatively, a second item of media may provide data defining one or more modifications to one or more attributes of a vehicle that are different from any default data either provided by the first item of media or by a separate second item of media defining the vehicle itself, such as, but not limited to, a particular paint job, a particular component, a particular type of tires, an engine enhancement, etc.

Similarly yet, in an embodiment where the first item of media provides a baseball game, a second item of media may define a player of a baseball team, i.e., may provide default data defining the player, such as, but neither required to include nor limited to, data defining the size of the player, the strength of the player, whether the player is left or right handed, the speed of the player, the appearance of the player, etc. Additionally or alternatively, a second item of media may provide data defining one or more modifications to one or more attributes of a player that are different from any default data either provided by the first item of media or by a separate second item of media defining the player him/herself, such as, but not limited to, a particular season's statistics, a particular strength level, a particular running speed, a size of bat, etc.

Other types of games are equally within the scope of the present disclosure and the present disclosure is not limited to the examples discussed herein, including the types of games, the aspects of games embodied in the items of second media, the attributes of the various aspects, etc.

Accordingly, media devices embodied in video game consoles according to the present disclosure may be configured to receive and read first and second items of media as discussed herein. As discussed above, consoles may include one or more media devices, and such one or more media devices may be of the same type or of a different type from each other. Whether one or more than one, and whether of the same or different type, consoles according to the present disclosure include at least one media device configured to read first items of media (i.e., containing instructions executable according to a video game) and at least one media device configured to read second items media (i.e., containing data defining an aspect of a video game).

For example, in the illustrated embodiment, console 12 includes first media device 46 in the form of an optical drive 48 configured to receive and read first items of media in the form of optical disc 57 containing instructions executable according to a video game. Console 12 also includes second media device 50 in the form of proximity device 52 configured to read second items of media in the form of game cards 55 with transponders 88 embodied therein and containing second data defining an aspect of a video game. However it is equally within the scope of the present disclosure that a console may include a single media device configured to receive and read data from both first items of media and second items of media.

Because video game systems according to the present disclosure may include various items of media embodying various different data related to video games, various methods of using the data and/or implementing the data within the systems and/or by the consoles may be used. For example, some items of media used in video game systems may be limited to a total number of times the data embodied thereon may be accessed. Stated differently, some items of media may be configured to limit access to the data to a predetermined number of accesses by a media device. Stated differently yet again, the data embodied on some items of media may be accessible only a predetermined number of times.

Additionally or alternatively, the control units or consoles, whether operating according to instructions from a first item of media or whether operating according to instructions embodied in permanent memory for example, may control when the maximum number of uses for a particular item of media has been reached. In other words, the item of media may have an identity which the control unit recognizes and catalogs or otherwise keeps track of the total number of times the particular item of media has been used with that particular console. Accordingly, when the maximum number of times is reached, the control unit, operating according to instructions, may prevent further access to the item of media. An item of media that has been used a maximum number of times may be described as being spent.

Yet another way of describing embodiments where data relating to an aspect of a video game may only be accessed a predetermined number of times, is as follows: An item of media readable by a video game console and writeable to record data correlating to a number of times the data defining an aspect of a video game has been read by the console may embody (1) data defining an aspect of a video game, (2) data defining a maximum number of times that the data defining an aspect of a video game can be read during a predetermined period, (3) instructions, for execution by the console, to read the data defining an aspect of a video game, and (4) instructions, for execution by the console, to read the data defining the number of times the data defining an aspect of a video game has been read.

In some embodiments, items of media may have a maximum number of times the data is accessible, period, while in other embodiments, items of media may have a maximum number of times the data is accessible during a single play session or other predetermined duration such as on a per game basis. For example, in the latter instance, data from an item of media may be accessible only five times during a single play session, but the data will be available five times again during a next play session. A play session may be a round of a game, a session of use of a console (e.g., as long as the console remains powered), etc.

Such configurations discussed and embodied in a video game system may encourage a player to limit the number of times he/she uses a particular item of media because he/she has the knowledge that it will not provide an unlimited number of uses. An example of such a scheme is where the item of media includes data defining an attribute of a character. For example, using the fighting game example discussed above, a particular item of media may embody data defining a special maneuver, the maneuver designed to inflict a fatal blow to an opponent. Such item of media may only be used ten times before the item of media can no longer be used, therefore making the player in possession of the item of media use it sparingly.

Additionally or alternatively, some items of media may be configured such that at least a portion of the data embodied therein is accessible by a media device only for a predetermined length of time. For example, an item of media may be activated upon an initial use. Thereafter, the item of media may be configured to only allow access to the data embodied thereon for a specific time period after activation. Such a property of the item of media may be carried out in a number of ways. One such example is where a console includes an internal clock, and when an item of media is activated, the console writes time data corresponding to the activation, to the item of media. Thereafter, whenever any console, whether the same console or a different console, attempts to access data from the item of media, the time data may be queried and if the predetermined length of time has lapsed, the data may no longer be accessible. Other ways of implementing such a scheme are also possible and within the scope of the present disclosure.

Another way of describing such embodiments of items of media is as follows: An item of media readable by a video game console may embody (1) data defining an aspect of a video game, (2) data defining an expiration time for the data defining an aspect of a video game, (3) instructions, for execution by the console, to read the data defining an expiration time for the data defining an aspect of a video game, and (4) instructions, for execution by the console, to read the data defining an aspect of a video game.

In some embodiments, the item of media may further embody instructions, for execution by the console, to write data defining a time corresponding to a first instance of the console reading the data defining an aspect of a video game, wherein the expiration time is a time relative to the first instance of the console reading the data defining an aspect of a video game. In other embodiments the expiration time may be a predetermined instance in time not dependent on the first instance of the console reading the data. In other words, items of media may simply be created with an expiration date, such that beyond the expiration date, the item of media is no longer readable by a console. Again, other ways of implementing such a characteristic of an item of media are also possible and within the scope of the present disclosure.

Other methods of using the data and/or implementing data within the systems and/or by the consoles are also possible. For example, even though a player or players may have used an item of media an otherwise maximum number of times, the item of media may be able to be recharged (i.e., restored so that the data may be accessed again a certain number of times, whether the previous maximum number of times or a greater or a fewer number of times). Examples of actions that may permit a player to recharge an item of media include, but are not limited to, performing a specific maneuver with a character within a video game, discovering a hidden area or item within a video game, achieving a high score in a video game, beating an opponent in a video game, etc. Such actions may be described as predetermined manipulations of a character within a game environment.

Another description of an ability to recharge an item of media is as follows: An item of media readable by a video game console and writeable to record data correlating to a number of times the data defining an aspect of a video game has been read by the console may embody (1) data defining an aspect of a video game, (2) data defining a maximum number of times that the data defining an aspect of a video game can be read during a predetermined period, (3) instructions, for execution by the console, to read the data defining an aspect of a video game, (4) instructions, for execution by the console, to read the data defining the number of times the data defining an aspect of a video game has been read, and (5) instructions, for execution by the console, to read the data defining an aspect of a video game upon the number of times the data defining an aspect of a video game has been read equaling the maximum number of times that the data defining as aspect of a video game can be read after a player has performed a predetermined manipulation of a character within a video game.

Yet another description of an ability to recharge an item of media is as follows: An item of media readable by a video game console and writeable to record data correlating to a number of times the data defining an aspect of a video game has been read by the console may embody (1) data defining an aspect of a video game, (2) data defining a maximum number of times that the data defining an aspect of a video game can be read during a predetermined period, (3) instructions, for execution by the console, to read the data defining an aspect of a video game, and (4) instructions, for execution by the console, to read the data defining the number of times the data defining an aspect of a video game has been read, and (5) instructions, for execution by the console, to set the number of times the data defining an aspect of a video game has been read equal to zero after a player has performed a predetermined manipulation of a character within a video game.

Another implementation of the data embodied in an item of media may include different maximum number of uses for different characters. For example, an item of media may be accessible a first number of times when used in conjunction with a first character and may be accessible a second number of times when used in conjunction with a second character. Additionally or alternatively, an item of media may include data that has a value associated with it that is reduced when the data is accessed and further such that the data is no longer accessible (i.e., the item of media is spent) when the value reaches zero. A first character may reduce the value a first amount and a second character may reduce the value a second amount. Therefore an item of media may have a greater perceived value when used with one character than when used with another character.

Stated differently, an item of media readable by a video game console may embody (1) data defining an aspect of a video game, the aspect having a first value and a second value, (2) instructions, for execution by the console to, read the first value for use with a first character, and (3) instructions, for execution by the console, to read the second value for use with a second character.

Another implementation of the data embodied in an item of media may include the ability of a player to set the maximum number of times data embodied on an item of media is accessible during a single play session. Stated differently, An item of media readable by a video game console and writeable to record data correlating to a number of times the data defining an aspect of a video game has been read by the console may embody (1) data defining an aspect of a video game, (2) data defining a maximum number of times that the data defining an aspect of a video game can be read during a predetermined period, (3) instructions, for execution by the console, to read the data defining an aspect of a video game, and (4) instructions, for execution by the console, to read the data defining the number of times the data defining an aspect of a video game has been read, and (5) instructions, for execution by the console, to set the maximum number of times that the data defining an aspect of a video game can be read equal to a value input by a user of the video game console.

Another type of data that may be embodied on items of media and that may be described as embodying an aspect of a video game or an attribute of a game environment is data defining a key for use in a video game to permit a user of the item of media to access an otherwise locked, or inaccessible, game environment. Stated differently, an item of media readable by a video game console may embody (1) data defining a key, and (2) instructions, for execution by the console, to read the data defining a key after a player reaches an impasse within a video game environment.

Now that various types of media including various types of data embodied therein have been described, it may be appreciated that video game systems according to the present disclosure may provide a particular type of gaming experience different than traditional home gaming systems.

For example, in embodiments where the second items or type of media are in the form of game cards, such game cards may be used as trading cards between individuals. That is, on a macro level, a video game system according to the present disclosure may provide various sets of game cards collectable by players of the system. For example, a particular video game title may have various characters associated with it, and such characters may be defined by data embodied on data storage devices integral to a plurality of character cards. Further, the characters may have various attributes associated therewith, the attributes being defined by data on the character cards or additionally or alternatively defined by data on separate modification cards. Accordingly, players of a video game system may purchase and/or trade various character and/or modification cards as a way of obtaining a particular character with a particular trait for use with a console and the playing of a video game. Similarly, environments of video games and aspects of environments may be provided on environment cards and environment modification cards.

To further enhance the trading card aspect of a video game system, various sets and subsets of types of cards may be provided. For example, a given number of a first character card may be released or sold to the public, while a lesser number of a second character card may be released or sold to the public, thus making the second character cards more valuable (even if just perceived value) to players of the video game system.

Similarly, a given number of a first modification card may be released while a lesser number of a second modification card may be released, thus making the second modification cards more valuable. As a non-exclusive example, in a role playing video game, one set of modification cards may relate to spells capable of being cast by characters within a game environment. A first subset of such spell cards may include data defining a spell that is configured to reduce an opponent's power level by fifty percent, while a second subset of such spell cards may include data defining a spell that, within the video game environment, is configured to reduce an opponent's power level by twenty five percent. Accordingly, the first subset of spell cards may be more valuable to players than the second subset of spell cards. Thus a provider of game cards may release fewer spell cards from the first set than from the second set, making it more difficult for players to obtain such spell cards. Additionally or alternatively, providers of game cards may sell cards from sets having a fewer number for a higher price than they sell cards from sets having a greater number.

Trading card schemes as discussed above are not limited to spell cards provided for use in a role-playing video game, and may be implemented in any of the various forms of media discussed, whether embodying data defining characters, attributes of characters, environments, attributes of environments, or any other appropriate aspect of video games.

Now that various components of video game systems including various forms and characteristics of data embodied in media have been described, it may be appreciated that methods of playing video games from both the perspective of a player or players of the systems as well as from the perspective of the systems or consoles may be provided and are within the scope of the present disclosure.

Figure 9:
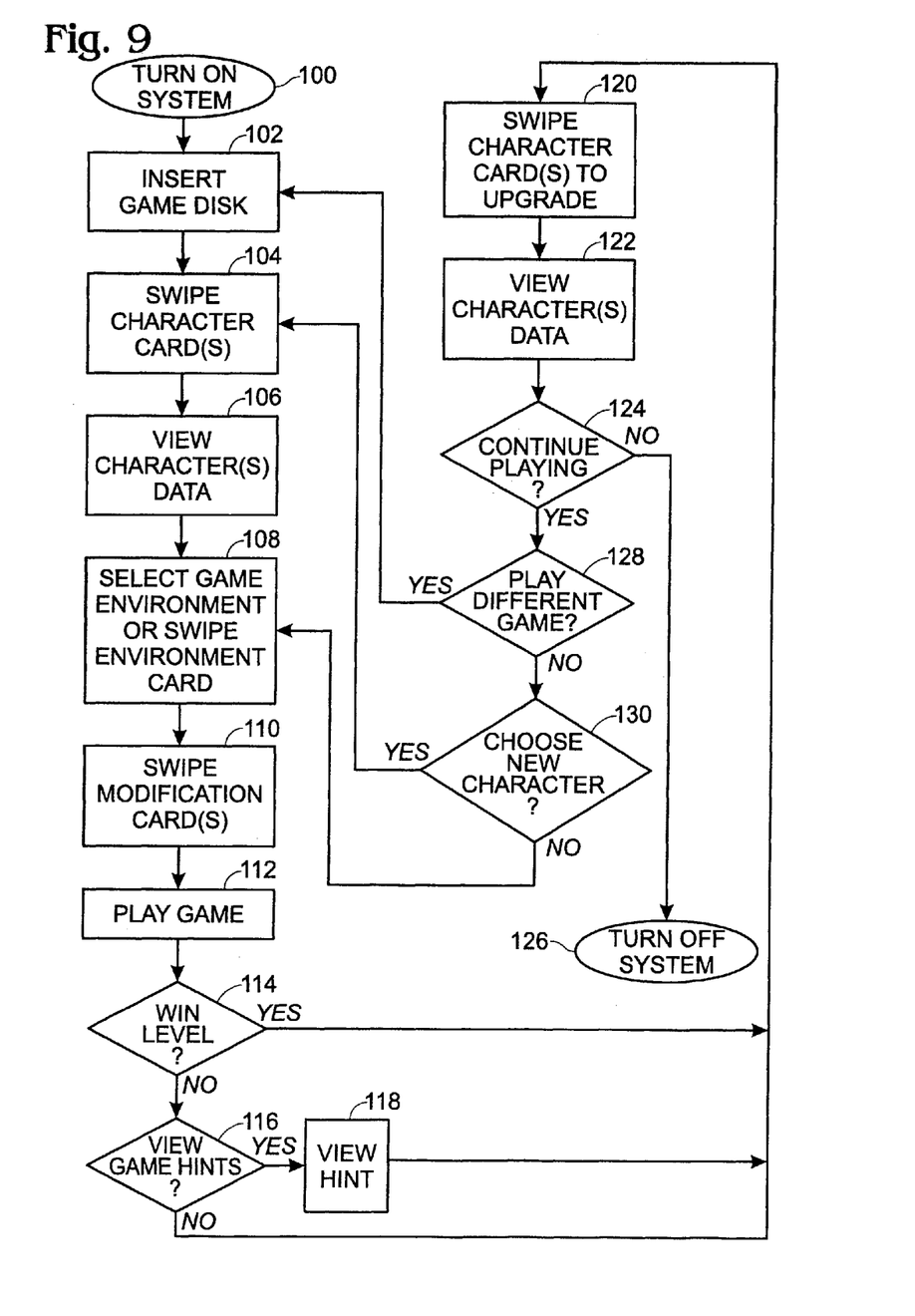
FIG. 9 is a flow chart illustrating an exemplary use of a video game system.

Referring to FIG. 9, a flow chart representing a non-exclusive illustrative series of events and/or steps associated with a use of a video game system is provided. However, methods according to the present disclosure are not limited solely to the illustrated flow chart, as many variations are possible including variations in the order of the events and/or steps illustrated, omission of one or more of the events and/or steps illustrated, and addition of various other events and/or steps not illustrated. Furthermore, the illustrated flow chart is indicated using terms corresponding to an exemplary embodiment of a video game system, e.g., including first media in the form of game disks and second media in the form of game cards; however, methods according to the present disclosure are not limited to such embodiments.

First, it should be appreciated that methods may be performed from the perspective of a player. For example, following the turning on of a system or console, as indicated at 100, a method of playing a video game on a video game console by a user, may comprise: (1) furnishing a first media to the console as indicated at 102, the first media including instructions executable according to a video game having at least one game environment; (2) furnishing a second media to the console, as indicated at 104, the second media including data defining a character including at least one attribute that can be modified; (3) furnishing a third media to the console, as indicated at 110, the third media including data defining a modification to the at least one attribute of the character; and (4) manipulating the character within the at least one game environment, as indicated at 112.

In some methods the first media may be of a different type than the second and third media. For example, as discussed, the first media may be in the form of an optical disc, while the second and third media may be in the form of game cards including wireless transponders. In such methods, furnishing second and third media may include locating the respective media relative to the console so that the respective wireless transponder effectively communicates with the console. In some methods, locating may include passing the respective media over the console. In some methods locating may include holding the respective media at a predetermined distance from the console for a predetermined length of time. In some methods, locating may include placing the second media on the console for a predetermined length of time.

Some methods may further comprise furnishing a fourth media to the console, as indicated at 108, the fourth media including data defining the at least one game environment.

Some methods may further comprise selecting a game environment from a plurality of game environments, as indicated at 108. In some methods, selecting a game environment is performed after furnishing a second media and before furnishing a third media, though other configurations are possible and within the scope of the present disclosure.

Some methods may further comprise, after furnishing the first media and before selecting the game environment, viewing a visual representation of at least a portion of the data defining the character, as indicated at 106.

Some methods may further comprise, after manipulating the character, re-furnishing the second media to the console so that the data defining the character can be updated by the console, as indicated at 120.

Some methods may further comprise viewing a visual representation of at least a portion of the data defining the character, as indicated at 106 and 122. In some methods, viewing the visual representation is performed after furnishing the second media and before furnishing the third media, though other configurations are possible and within the scope of the present disclosure. After viewing character data a player may decide whether to continue playing, as indicated at 124 and 128. If a player chooses not to continue playing, he/she may turn off the system, as indicated at 126. If a player decides to continue playing the same game, he/she may choose a new character, as indicated at 130.

Some methods may further comprise, after winning or losing a round of game play, a game, or a level within a game, as indicated at 114, receiving a hint for manipulating the character within the at least one game environment, as indicated at 116 and 118.

Some methods may further comprise, re-furnishing the second media while manipulating the character (e.g., during step 112). For example, a player may re-furnish the second media when a reward icon is displayed to the user by the video game. In other words, during game play and manipulation of a character in a game environment, the game may prompt the player through visual indication that a reward may be obtained if the player furnishes his/her second media. In some methods, the icon may be displayed for a limited time and the player may be required to furnish his/her second media while the icon is displayed.

Some methods may further comprise furnishing a fourth media to the console while manipulating the character within the at least one game environment (e.g., during step 112), the fourth media including data defining a second modification to the at least one attribute of the character. For example, a player may trigger a modification to an attribute of his/her character during game play if the player furnishes fourth media at an appropriate time. In some methods, providing the fourth media may trigger a modification to an attribute of an opponent.

It should also be appreciated that methods according to the present disclosure may be performed from the perspective of a video game system or a video game console. For example, a video game method may be implemented by a video game console, and may comprise: (1) receiving first data from a first media, as indicated at 102, the first data including data defining a video game with at least one game environment; (2) receiving second data from a second media to create received second data, as indicated at 104, the second data including data defining a character that can be manipulated within the at least one game environment, the character having at least one attribute that can be modified; (3) receiving third data from a third media, as indicated at 110, the third data including data defining a modification to the at least one attribute of the character; (4) transmitting video data for displaying the at least one game environment with the character on a display screen, as indicated at 106; and (5) receiving user input for manipulation of the character within the at least one game environment, as indicated at 112.

Some methods may further comprise receiving fourth data from a fourth media, the fourth data including data defining the at least one game environment, as indicated at 108.

In some methods receiving second and third data may include wirelessly receiving second and third data. In some methods, the console may include a radio frequency reader and the second and third items of media may each include a radio frequency transponder.

Some methods may further comprise transmitting video data for displaying a selection of the at least one game environment on a display screen and receiving user input for selection of a selected game environment, as indicated at 108. In some methods, transmitting video data for displaying a selection of the at least one game environment is performed after receiving second data and before receiving third data, as indicated in FIG. 9, though other configurations are equally within the scope of the present disclosure.

Some methods may further comprise, after receiving user input for manipulation of the character within the at least one game environment, updating the data defining the character with at least one modification to at least one of the at least one attribute, as indicated at 120. In some methods, the console may subsequently display a visual representation of at least a portion of the data defining the character on a display screen, as indicated at 112.

Some methods may further comprise providing a hint for manipulation of the character within the at least one game environment. In some methods providing a hint includes transmitting video data and/or audio data for displaying and/or emitting a hint for manipulation of the character within the at least one game environment, as indicated at 118.

Some methods may further comprise, while receiving user input for manipulation of the character within the at least one game environment, updating the received second data with a modification to the at least one attribute of the character. In other words, the console may update the data received from the second item of media (e.g., in step 104) with changes to attributes of the character that result during the playing of a game. Accordingly, when second media is re-furnished (e.g., during step 120), the second media can be updated with the changes made during game play. In some methods a reward icon may be displayed to the player during game play, and thus if the player re-furnishes the second media while or immediately after the reward icon is displayed, the received second data may be updated accordingly. Re-furnish, as used here, means to again (i.e., the console previously received data from the second item of media) furnish the second media to the second media device in the appropriate manner depending on the embodiment. For example, in embodiments incorporating a proximity device and game cards, the game card is again swiped to save the changes made during game play.

Some methods may further comprise receiving fourth data from a fourth media while receiving user input for manipulation of the character within the at least one game environment, the fourth media including data defining a second modification to the at least one attribute of the character. For example, if a player finds his/her character in a particular situation within a game environment, he/she may affect a modification to an attribute of his/her character that may be beneficial to the situation. The present disclosure is not limited to this example however, and others are equally within the scope of a method.

Some methods may further comprise receiving fourth data from a fourth media while receiving user input for manipulation of the character within the at least one game environment, the fourth media including data defining a modification to an attribute of an opponent of the character. For example, during game play, a player may furnish a fourth media to inflict a particular weapon upon an opponent, whether the opponent is another player of the video game or a virtual opponent controlled by the software of the system. Again, other examples are equally within the scope of the present disclosure.

In some methods, receiving third data includes modifying the data defining the character a predetermined number of times. In some methods, after modifying the data defining the character a predetermined number of times, the method further comprises notifying a user that the third media will no longer provide the data defining the modification to the at least one attribute of the character. In other words, some items of third media may be configured to have a limited use, whether rechargeable or not, as discussed above.

In some methods, the at least one attribute has a range of values with a maximum value, and the value of the at least one attribute changes as a user manipulates the character within the at least one game environment. In such methods, the method may further comprise, when the value reaches the maximum value, transmitting fourth data to a fourth media, the fourth data including data defining a modification to at least one attribute of a second character. For example, a particular character may have a maximum level of power points equal to one hundred. While playing with the character, the player may perform certain actions that would otherwise increase the power level of his/her character. But if his/her character is already at a maximum value (e.g., one hundred), the system may permit the player to transfer the surplus power points to an item of fourth media so the player can use the power points at a later time for a different character. Other examples are equally within the scope of such a recited method.

Some methods may further comprise receiving user input for setting a predetermined number of times receiving third data may be performed during a single play session of the video game. For example, some games may permit a player to set the number of times a modification to a character attribute or attributes may be made during a particular game. Such a method allows a player to manipulate the difficulty of a particular game. In some such methods, receiving third data includes receiving the third data the predetermined number of times during a single play session, and the method further comprises, after receiving the third data the predetermined number of times and when a user inputs a predetermined manipulation of the character within the at least one game environment, receiving third data an additional time beyond the predetermined number of times. In other words, even though a maximum number of modifications was set by the player, if the player performs a special move, or manipulation of his/her character, the player may be permitted to make additional modifications beyond the set maximum, as a reward for having accomplished the special move. Other examples are equally within the scope of such methods.

In some methods, the at least one game environment may include a special environment. In such methods, the methods may further comprise receiving fourth data from a fourth media and, after receiving fourth data, transmitting video data for displaying the special environment with the character on a display screen. For example, in some games a particular level may be locked and may only be accessible if a player provides a key in the form of fourth media during game play. Stated differently, a player may reach an impasse within a game that can only be surpassed with the furnishing of a special item of media. Other examples are equally within the scope of the present disclosure.

In some methods, the third data may include data having a first value and a second value, such that the first value is associated with a first character and the second value is associated with a second character. For example, a game card configured to provide power points to characters may be worth more for one character than for another.

Some methods may further comprise, after receiving the third data a predetermined number of times and when a user inputs a predetermined manipulation of the character within the at least one game environment, again receiving the third data the predetermined number of times.

For example, in a role playing game, an item of media embodying a spell may be configured to be useable only ten times by a character. Once the spell has been used ten times (i.e., the item of media is spent), it may no longer be used until the player performs a special move, uncovers a particular item in the game, or any other predetermined manipulation of the character.

It should also be appreciated that methods according to the present disclosure may be performed from the perspective of a video game system of a video game console with more than one player of the system or console. For example, a video game method may be implemented by a video game console, and may comprise one or more of: (1) receiving first data from a first media, the first data including data defining a video game with at least one game environment; (2) receiving second data from a second media provided by a first player, the second data including data defining a first character that can be manipulated within the at least one game environment, the first character having at least one attribute that can be modified; (3) receiving third data from a third media provided by a second player, the third data including data defining a second character that can be manipulated within the at least one game environment, the second character having at least one attribute that can be modified; (4) transmitting video data for displaying the at least one game environment with the first and second characters on a display screen; (5) receiving user input from the first and second players for manipulation of the first and second characters, respectively, within the at least one game environment; (6) transmitting video data for displaying a reward icon for a predetermined length of time on a display screen, the reward icon representing a character attribute modification; (7) updating the data defining the first character with the character attribute modification if, while the reward icon is displayed, the first player re-provides the second media before the second player re-provides the third media; and (8) updating the data defining the second character with the character attribute modification if, while the reward icon is displayed, the second player re-provides the third media before the first player re-provides the second media and while the reward icon is displayed. For example, during the playing of a video game by two players, an icon may appear on the screen. The player to first furnish his/her media embodying his/her character while the reward icon is displayed, gets to collect whatever reward the icon represents. For example, two players may be playing a fighting game, and a weapon may appear on the screen (e.g., furnished by a virtual character within the game). The first player to provide his/her appropriate media may get to collect the weapon for use during the fight. Other examples are equally within the scope of the present disclosure.

It should now be appreciated that video game systems according to the present disclosure are configured to provide unique gaming experiences. The following discussion describes but a few exemplary types of game play that may be provided and implemented on video game systems according to the present disclosure. The following discussion is presented with reference to embodiments incorporating radio frequency technology including game cards with radio frequency transponders; however, the various types of game play discussed should be interpreted as being equally capable of implementation in other embodiments of video game systems according to the present disclosure not necessarily incorporating radio frequency technology.

In a battle mode, two or more players may compete against each other in a head-to-head competition in which the capabilities of their game characters are tested. Alternatively, a single player may play against a computer-controlled opponent if a second game player is not available. In battle mode, initial scanning of one or more character cards may not lead to those characters being displayed on a game display until the time for beginning the battle. Once all the players have scanned their chosen characters and their character attributes, the characters and their attributes may be revealed. Accordingly, players may not get to select their character based upon another player's selection.

In a special mission game mode, a game player may choose to attempt a mission that advances an overall game storyline. In some circumstances, a game player may choose any game character to use in attempting a game mission. In other circumstances, it may be that a particular game character has one or more special missions to accomplish, or that a particular mission may only be attempted by a specific game character. For example, if the overall game theme is X-MEN®., then it could be that a player using the JEAN GREY game character would be allowed to attempt a game mission relating to GREY's psychic powers, whereas the same game mission may not be available if the game player chose to use a WOLVERINE game character.

Once a game mission is completed, it may be that a next portion of an overall game storyline is made available for play. It may also be that in the special mission game mode, a plurality of players may cooperate to accomplish a game task. For example, if one player wishes to work with another player to complete a mission, the first player may swipe a second, or third, etc., card to add another character to the mission. Such cooperative game play may be useful if, for example, a number of opponents must be overcome nearly simultaneously for successful completion of a game challenge. If another player is available to control the one or more added game characters, then the new player may control the character. Alternatively, if there is not another player available to control the one or more added game characters, then the console processor may control the character so that a single game player may play a cooperative game even in the absence of another human game player.

As another possibility, it could be that any number of characters may be controlled by human game players, with a plurality of other characters, of any desired number, being controlled by the console processor or by any other suitable computing device.

In a fusion game mode, a player may combine the attributes of one or more game characters to create a new game character.

In a training game mode, a player may increase the level of one of a game character's attributes. Training may enable a game player to increase the level of a game character's attribute by completing one or more controlled missions that focus on use of that particular attribute. For example, in an X-MEN® game, a player attempting to improve WOLVERINE melee claws attack may do so by systematically defeating a number of opponents using that particular attack. Improving one or more of a game character's attributes could be used to make that game character more powerful in a given game, or may make that game character more valuable, should the player want to trade the game card of that character for the game card of a different character. Although training may be used to increase a game character's abilities within a given ability level (for example, a rating of three on a scale from one to five), training may not necessarily be used to increase a game character's abilities from one level to another, higher level.

As another possibility for training, it could be that a first game character meets a second game character during the course of a mission, challenge, etc. The second game character may teach the first game character a new technique or skill. As a way for the first character to retain that skill, the console may instruct a player controlling that character to swipe a given modification card for that technique or skill, thus adding the technique or skill to the attributes of the first game character.

It is believed that the disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

What is claimed is:

1. A method of operating a video game involving multiple characters playable by multiple players, the method comprising the steps of:
   displaying an environment of the video game on a display screen;
   displaying an icon on the display screen during the video game;
   receiving, by a media device, an input from a first one of the players who provides an item of media after the icon is displayed; and
   attributing a reward associated with the icon with the character being played by the first player.

2. The method of claim 1, wherein the icon that is displayed on the display screen is representative of the reward.

3. The method of claim 1, wherein the icon resembles a weapon, and the reward includes the character of the first player having an attribute of the weapon for use in the video game.

4. The method of claim 3, wherein the character of the first player has the weapon associated therewith on the display screen during the video game after the reward has been attributed to the character of the first player.

5. The method of claim 1, wherein the reward can be used by the character being played by the first player during the video game.

6. The method of claim 1, wherein the step of receiving an input includes receiving information from an item of media that is swiped relative to the media device.

7. The method of claim 6, wherein the item of media is a card with a radio frequency transponder and the media device includes a radio frequency reader.

8. The method of claim 1, wherein the step of attributing a reward occurs if the input is received while the icon is present on the display screen.

9. The method of claim 1, wherein the step of displaying an icon on the display screen involves displaying the icon for a predetermined length of time, and the step of attributing the reward occurs if the input is received while or immediately after the reward icon is displayed.

10. The method of claim 1, wherein the icon represents a character attribute modification in the video game.

11. A video game system playable by multiple players and involving multiple characters, the video game system comprising:
    a video game console including:
        a housing;
        a control unit supported by the housing, the control unit configured to:

send a signal to display an environment of a video game on a display screen;
send a signal to display an icon on the display screen during the video game;
receive an input from a first one of the players who provides an item of media after the icon is displayed; and
attribute a reward associated with the icon with the character being played by the first player.

12. The video game system of claim 11, further comprising the display screen.

13. The video game system of claim 11, wherein the control unit is further configured to display the reward being used by the character being played by the first player during the video game.

14. The video game system of claim 11, wherein the control unit is configured to receive an input by receiving information from an item of media that is swiped relative to a media device.

15. The video game system of claim 14, wherein the item of media is a card with a radio frequency transponder and the media device includes a radio frequency reader.

16. The video game system of claim 14, further comprising the item of media and the media device.

17. The video game system of claim 11, wherein the control unit is configured to attribute a reward if the input is received while the icon is present on the display screen.

18. A video game system playable by multiple players and involving multiple characters, the video game system comprising:
   a video game console including:
      a housing;
      a control unit supported by the housing, the control unit configured to:
         send a signal to display an environment of a video game on a display screen;
         send a signal to display an icon on the display screen during the video game, the icon resembles a weapon;
         receive an input from a first one of the players who provides an item of media after the icon is displayed; and
         attribute a reward associated with the icon with the character being played by the first player, the reward includes the character of the first player having an attribute of the weapon for use in the video game;
         send a signal to display the character of the first player associated with the weapon during the video game after the reward has been attributed to the character of the first player.

19. A method of operating a video game involving multiple characters playable by multiple players, the method comprising the steps of:
   displaying an environment of the video game on a display screen;
   displaying an icon on the display screen during the video game, the icon representing a character attribute modification;
   receiving, by a media device, an input from a first one of the players who provides an item of media after the icon is displayed; and
   updating data defining the character being played by the first player with the character attribute modification.

20. The method of claim 19, wherein the step of receiving an input involves receiving information from an item of media that is swiped relative to the media device, and the step of updating data occurs if the item of media is swiped while the reward icon is displayed.

* * * * *